United States Patent
Hartup et al.

(10) Patent No.: US 6,295,317 B1
(45) Date of Patent: Sep. 25, 2001

(54) METHOD AND APPARATUS FOR DEMODULATING AND EQUALIZING AN AM COMPATIBLE DIGITAL AUDIO BROADCAST SIGNAL

(75) Inventors: David Carl Hartup, West Chester; Don R. Goldston, Mason, both of OH (US)

(73) Assignee: USA Digital Radio Partners, LP, Columbia, MD (US)

(*) Notice: Subject to any disclaimer, the term of this patent is extended or adjusted under 35 U.S.C. 154(b) by 0 days.

(21) Appl. No.: 09/208,107

(22) Filed: Oct. 2, 1998

(51) Int. Cl.[7] .......................... H03K 5/159; H03K 9/00; H04L 27/06
(52) U.S. Cl. ......................... 375/235; 375/216; 375/320
(58) Field of Search ............................ 375/260, 235, 375/232, 316, 216, 268, 320, 350; 370/208; 329/347; 381/2, 3, 415, 15

(56) References Cited

U.S. PATENT DOCUMENTS

| | | |
|---|---|---|
| 4,379,947 | 4/1983 | Warner . |
| 4,425,642 | 1/1984 | Moses et al. . |
| 4,534,054 | 8/1985 | Maisel . |

(List continued on next page.)

FOREIGN PATENT DOCUMENTS 9749207    12/1997    (WO) .

OTHER PUBLICATIONS

A.J. Vigil, "Wireless data transmission through in–band on–channel digital audio broadcasting", *SPIE vol. 2601*, Jun. 1995, pp. 105–114.

D. Funderburk et al., "A Digital Receiver Design for AM Stereo Signals Using Compatible Quadrature Amplitude Modulation", 920083, Motorola Inc. (no date), 7 pp.

Kroeger, B., Vigil, A., "Improved IBOC DAB Technology For AM and FM Broadcasting", Oct. 1996.

(List continued on next page.)

Primary Examiner—Tesfaldet Bocure
(74) Attorney, Agent, or Firm—Robert P. Lenart, Esq.; Pietragallo, Bosick & Gordon (57) ABSTRACT

A method of demodulation and equalization is used to process an amplitude modulated compatible digital broadcasting signal including an amplitude modulated radio frequency signal having a first carrier modulated by an analog program signal in a first frequency spectrum, a plurality of digitally modulated carrier signals positioned within a bandwidth which encompasses the first frequency spectrum, a first group of the digitally modulated carrier signals including complementary carrier signals and lying within the first frequency spectrum, and second and third groups of the digitally modulated carrier signals including non-complementary carrier signals and lying outside of the first frequency spectrum. The method includes the steps of: taking a first Fast Fourier Transform of the amplitude modulated compatible digital signal to produce a first transformed signal representative of the non-complementary carriers; processing the first transformed signal to produce a first equalized signal by multiplying the first transformed signal by a first equalization vector, wherein the first equalization vector includes a first plurality of equalizer coefficients; updating the first plurality of equalizer coefficients; taking a second Fast Fourier Transform of the amplitude modulated compatible digital signal to produce a second transformed signal representative of the complementary carriers; determining a second equalization vector comprising a second plurality of equalizer coefficients, wherein the second plurality of equalizer coefficients is determined by interpolating coefficients of the first plurality of equalizer coefficients; and processing the second transformed signal to produce a second equalized signal by multiplying the second transformed signal by the second equalization vector. The invention also encompasses the operation of radio frequency receivers which utilize the above method, as well as apparatus that performs the above method and radio frequency receivers which utilize the above equalization method.

28 Claims, 5 Drawing Sheets

U.S. PATENT DOCUMENTS

| | | |
|---|---|---|
| 4,660,193 | 4/1987 | Young et al. . |
| 4,817,116 | 3/1989 | Akaiwa et al. . |
| 4,881,241 | 11/1989 | Pommier et al. . |
| 4,881,245 | 11/1989 | Walker et al. . |
| 5,020,076 | 5/1991 | Cahill et al. . |
| 5,117,195 | 5/1992 | Robbins . |
| 5,128,933 | 7/1992 | Baranoff-Rossine . |
| 5,134,630 | 7/1992 | Bateman . |
| 5,134,634 | 7/1992 | Yoshida . |
| 5,251,232 | 10/1993 | Nonami . |
| 5,274,629 | 12/1993 | Helard et al. . |
| 5,311,550 | 5/1994 | Fouche et al. . |
| 5,315,583 * | 5/1994 | Murphy et al. ............ 381/4 |
| 5,390,214 | 2/1995 | Hopkins et al. . |
| 5,406,551 | 4/1995 | Saito et al. . |
| 5,499,271 | 3/1996 | Plenge et al. . |
| 5,559,830 | 9/1996 | Dapper et al. ............ 375/230 |
| 5,584,051 | 12/1996 | Göken . |
| 5,588,022 | 12/1996 | Dapper et al. ............ 375/216 |
| 5,592,471 | 1/1997 | Briskman . |
| 5,606,576 | 2/1997 | Dapper et al. ............ 375/268 |
| 5,633,896 | 5/1997 | Carlin et al. ............ 375/340 |
| 5,673,292 | 9/1997 | Carlin ............ 375/269 |
| 5,703,954 | 12/1997 | Dapper et al. ............ 381/15 |
| 5,757,854 | 5/1998 | Hunsinger et al. . |
| 5,764,706 | 6/1998 | Carlin et al. ............ 375/326 |
| 5,809,065 | 9/1998 | Dapper et al. ............ 375/215 |
| 5,949,796 * | 9/1999 | Kumar ............ 375/347 |
| 6,128,334 * | 10/2000 | Dapper et al. ............ 375/216 |

OTHER PUBLICATIONS

M. Alard, R. Lassale, "Principles of modulation and channel coding for digital broadcasting for mobile receivers", EBU Review, No. 224, pp. 168–190, Aug. 1987.

Kroeger, B.W., Peyla, P.J., "Robust IBOC DAB AM and FM Technology For Digital Audio Broadcasting", Apr. 1997.

Hartup, D. C., Alley, D.M., Goldston, D. R., "AM Hybrid IBOC DAB System", Sep. 1997.

* cited by examiner

METHOD AND APPARATUS FOR DEMODULATING AND EQUALIZING AN AM COMPATIBLE DIGITAL AUDIO BROADCAST SIGNAL

BACKGROUND OF THE INVENTION

This invention relates to radio broadcasting and, more particularly, to methods of and apparatus for demodulating and equalizing a signal in a receiver for an amplitude modulated compatible digital broadcasting system.

There has been increasing interest in the possibility of broadcasting digitally encoded audio signals to provide improved audio fidelity. Several approaches have been suggested. One such approach, set forth in U.S. Pat. No. 5,588,022, teaches a method for simultaneously broadcasting analog and digital signals in a standard AM broadcasting channel. The broadcast signal includes an amplitude modulated radio frequency signal having a first frequency spectrum. The amplitude modulated radio frequency signal includes a first carrier modulated by an analog program signal. The signal also includes a plurality of digitally modulated carrier signals within a bandwidth which encompasses the first frequency spectrum. Each of the digitally modulated carrier signals is modulated by a portion of a digital program signal. A first group of the digitally modulated carrier signals lies within the first frequency spectrum and is modulated in quadrature with the first carrier signal. Second and third groups of the digitally modulated carrier signals lie outside of the first frequency spectrum and are modulated both in-phase and in-quadrature with the first carrier signal.

The waveform in the AM compatible digital audio broadcasting system described in U.S. Pat. No. 5,588,022, was formulated to provide optimal data throughput for the digital signal while avoiding crosstalk into the analog AM channel. Multiple carriers are employed by means of orthogonal frequency division multiplexing (OFDM) to bear the communicated information.

Monophonic detectors for consumer AM radios respond only to the envelope and not the phase of the received signal. Because of the use of the multiple digitally modulated carriers, there is a need for a means to reduce the envelope distortion caused by this hybrid signal. U.S. patent application Ser. No. 08/671,252, assigned to the assignee of the present invention, discloses a method for reducing envelope distortion in an AM compatible digital audio broadcasting system. Certain digital carriers that are above the frequency of the analog AM carrier have an associated digital carrier that is at an equal frequency offset below the analog AM carrier. The data and modulation placed on the upper digital carrier and its counterpart are such that the signal resulting from their addition has no component that is in-phase with the analog AM carrier. Digital carrier pairs arranged in this way are said to be complementary. Carriers that are not directly beneath the analog signal spectrum are called non-complementary, and are modulated in-phase and in-quadrature to the AM carrier. This configuration delivers dramatic fidelity improvements to analog AM reception of digital broadcast signals.

At the receiver, the digital signal is demodulated by means of a Fast Fourier Transform (FFT). One possible method and associated apparatus to perform the demodulation is described in U.S. Pat. No. 5,633,896. That patent discloses a demodulation technique which minimizes the undesired crosstalk between the analog signal and the digital signals in an AM compatible digital audio broadcasting (AM DAB) system using an orthogonal frequency division multiplexed (OFDM) modulation format, by employing dual Fast Fourier Transform processes on separate respective in-phase and quadrature-phase components of a received OFDM digital signal. The output of the quadrature channel is used to recover the complementary data, and the resultant processed component signals are summed to recover the non-complementary data.

The received multi-carrier signal requires equalization in the presence of dynamic channel response variations. Without such equalization, a very distorted signal would be detected and the digital broadcasting signal information would be unrecoverable. An equalizer enhances the recoverability of the digital audio broadcasting signal information. One such equalizer is disclosed in U.S. Pat. No. 5,559,830. The equalizer disclosed therein includes means for receiving an AM compatible digital audio broadcasting waveform and storing that waveform as a waveform vector. The equalizer then processes that waveform by multiplying the waveform vector by an equalization vector. This equalization vector comprises a plurality of equalizer coefficients, each of the coefficients initially set to a predetermined value. The equalizer then compares each location of the processed waveform vector with a stored waveform vector. The equalizer selects as the signal that vector location closest to the stored waveform vector. Preferably, the equalizer includes means for updating the equalizer coefficients using the waveform vector, the processed waveform vector, and the stored waveform vector to provide immunity to noise and response to channel changes.

In the equalizers of both U.S. Pat. No. 5,633,896 and U.S. Pat. No. 5,559,830, frequency domain information is presented to the equalizer as a frequency domain vector. Each block of frequency domain information is stored in a storage array. This storage array vector is multiplied by a plurality of equalizer coefficients. The resulting product of this multiplication is an equalized signal. A set of exact values is known a priori in the equalizer against which each vector location of the equalized signal can be compared. The ideal value closest to that described in the vector location is chosen as the actual signal value. The vector of decisions is stored in a decision array. Using the received signal, the equalized signal, and the decision array, an equalizer coefficient estimator calculates coefficient estimates. To provide immunity to noise, the equalizer coefficient estimates can be averaged over time. The rate of coefficient update determines equalizer noise immunity and convergence rate. Coefficients in different parts of the band may be updated at different rates depending on knowledge of the distortion mechanism. U.S. Pat. No. 5,633,896 and U.S. Pat. No. 5,559,830 are hereby incorporated by reference.

While the dual FFT technique can improve system performance in a channel that has symmetric magnitude and anti-symmetric phase about the AM carrier frequency over the frequency range of the complementary carriers, for channels with non-symmetric magnitude or non- anti-symmetric phase, the process of using only the quadrature channel FFT output to obtain the complementary data destroys the non-symmetric magnitude and non- anti-symmetric phase information and the signal that drives the equalizer is not correct. A United States patent application for a "Method For Equalization Of Complementary Carriers In An AM Compatible Digital Audio Broadcast System", by the present inventors and M. Matherne, filed on the same date as this application, and assigned to the same assignee, discloses an equalization method that can provide proper equalizer coefficients when the equalizer coefficients may have non-symmetric magnitude or non- anti-symmetric phase.

Demodulation of the non-complementary carriers may require a high-pass filter on the in-phase portion of the signal to eliminate spectral spillage in the FFT from the analog signal. However, when a high-pass filter is applied, information in the in-phase signal is destroyed, thus preventing proper equalization of the complementary digital carriers. For channels that have non-symmetric magnitude or non-anti-symmetric phase over the spectral region of the analog signal, the destroyed information prevents proper equalization of the complementary carriers. The channel, as referred to here, includes not only phenomenon that affect propagation of the signal, but also any component in the transmitter or receiver that affects the magnitude and phase of the received signal. The present invention provides a method of demodulating the digital signal without the drawback of either spectral spillage of the analog signal onto the non-complementary carriers or destroying information needed for proper equalization of the complementary carriers. The present invention seeks to provide an improved demodulation and equalization method and receivers which include the method.

SUMMARY OF THE INVENTION

The present invention provides a method of demodulating and equalizing an AM compatible digital broadcast signal. The method includes estimating the equalizer coefficients for the complementary carriers while still retaining the benefits of combining the information from the complementary carrier FFT outputs. The method uses information from the non-complementary carriers to estimate, via interpolation, the equalizer coefficients for the complementary carriers.

The demodulation and equalization method of the present invention is used to process an amplitude modulated compatible digital broadcasting signal including an amplitude modulated radio frequency signal having a first carrier modulated by an analog program signal in a first frequency spectrum, a plurality of digitally modulated carrier signals positioned within a bandwidth which encompasses the first frequency spectrum, a first group of the digitally modulated carrier signals including complementary carrier signals and lying within the first frequency spectrum, and second and third groups of the digitally modulated carrier signals including non-complementary carrier signals and lying outside of the first frequency spectrum. The method includes the steps of: taking a first Fast Fourier Transform of the amplitude modulated compatible digital signal to produce a first transformed signal representative of the non-complementary carriers; processing the first transformed signal to produce a first equalized signal by multiplying the first transformed signal by a first equalization vector, wherein the first equalization vector includes a first plurality of equalizer coefficients; updating the first plurality of equalizer coefficients; taking a second Fast Fourier Transform of the amplitude modulated compatible digital signal to produce a second transformed signal representative of the complementary carriers; determining a second equalization vector comprising a second plurality of equalizer coefficients, wherein the second plurality of equalizer coefficients is determined by interpolating coefficients of the first plurality of equalizer coefficients; and processing the second transformed signal to produce a second equalized signal by multiplying the second transformed signal by the second equalization vector.

The invention also encompasses the operation of radio frequency receivers which utilize the above method, as well as apparatus that performs the above method and radio frequency receivers which utilize the above equalization method.

BRIEF DESCRIPTION OF THE DRAWINGS

The invention will be more readily apparent to those skilled in the art by reference to the accompanying drawing wherein.

DETAILED DESCRIPTION OF THE PREFERRED EMBODIMENTS

This invention provides a method for demodulating and equalizing carriers in a broadcast signal which includes both an analog amplitude modulated signal and a digital signal on the same channel assignment as the existing analog AM broadcasting allocation. The technique of broadcasting the digital signal in the same channel as an analog AM signal is called in-band on-channel (IBOC) broadcasting. This broadcasting is accomplished by transmitting a digital waveform by way of a plurality of orthogonal frequency division modulated (OFDM) carriers, some of which are modulated in-quadrature with the analog AM signal and are positioned within the spectral region where the analog AM broadcasting signal has significant energy. The remaining digital carriers are modulated both in-phase and in-quadrature with the analog AM signal and are positioned in the same channel as the analog AM signal, but in spectral regions where the analog AM signal does not have significant energy. In the United States, the emissions of AM broadcasting stations are restricted in accordance with Federal Communications Commission (FCC) regulations to lie within a signal level mask defined such that: emissions 10.2 kHz to 20 kHz removed from the analog carrier must be attenuated at least 25 dB below the unmodulated analog carrier level, emissions 20 kHz to 30 kHz removed from the analog carrier must be attenuated at least 35 dB below the unmodulated analog carrier level, and emissions 30 kHz to 60 kHz removed from the analog carrier must be attenuated at least [35 dB+1 dB/kHz] below the unmodulated analog carrier level.

Figure 1:
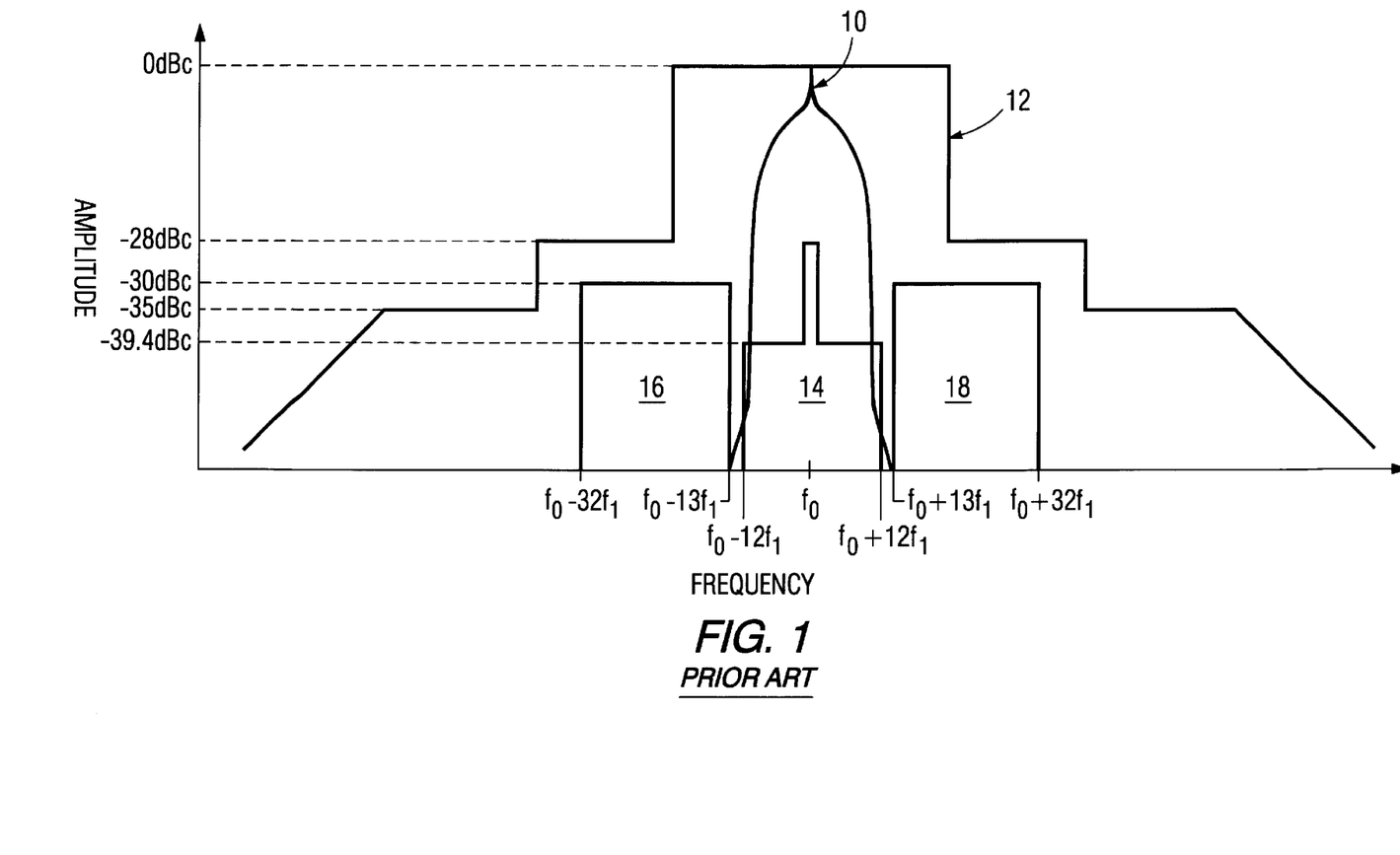
FIG. 1 is a diagrammatic representation of a prior art composite analog AM and digital broadcasting signal.

FIG. 1 shows the spectrum of an AM digital audio broadcasting signal of a type which can be utilized by the present invention. Curve 10 represents the standard broadcasting amplitude modulated signal, wherein the carrier has a frequency of $f_0$. The FCC emissions mask is represented by item number 12. The OFDM waveform is composed of a series of data carriers spaced at $f_1 = 59.535 \cdot 10^6/(131072)$, or about 454 Hz. A first group of twenty four of the digitally modulated carriers are positioned within a frequency band extending from $(f_0-12\,f_1)$ to $(f_0+12\,f_1)$, as illustrated by the envelope labeled 14 in FIG. 1. Most of these signals are placed 39.4 dB lower than the level of the unmodulated AM carrier signal in order to minimize crosstalk with the analog AM signal. Crosstalk is further reduced by encoding this digital information in a manner that guarantees orthogonality with the analog AM waveform. This type of encoding is called complementary encoding (i.e. complementary BPSK, complementary QPSK, or complementary 32 QAM) and is more fully described in the previously discussed copending application Ser. No. 08/671,252. Complementary BPSK modulation is employed on the innermost digital carrier pair at $f_0 \pm f_1$ to facilitate timing recovery. These carriers are set at a level of −28 dBc. All other carriers in this first group have a level of −39.4 dBc and are modulated using complementary 32 QAM for the 48 and 32 kbps encoding rates. Complementary 8 PSK modulation is used on carriers ranging from $(f_0-11\ f_1)$ to $(f_0-2\ f_1)$ and from $(f_0+2f_1)$ to $(f_0+11\ f_1)$ for the 16 kbps encoding rate. For all three encoding rates, the carriers at $(f_0-12\ f_1)$ and $(f_0+12\ f_1)$ carry supplementary data and may be modulated using complementary 32 QAM.

Additional groups of digital signals are placed outside the first group. The need for these digital waveforms to be in-quadrature with the analog signal is eliminated by restricting the analog AM signal bandwidth. The carriers in a second and a third group, encompassed by envelopes 16 and 18 respectively, may be modulated using, for example, 32 QAM for the 48 and 32 kbps rates, and 8 PSK for the 16 kbps rate. The carriers are set at levels of −30 dBc for all encoding rates.

Figure 2:
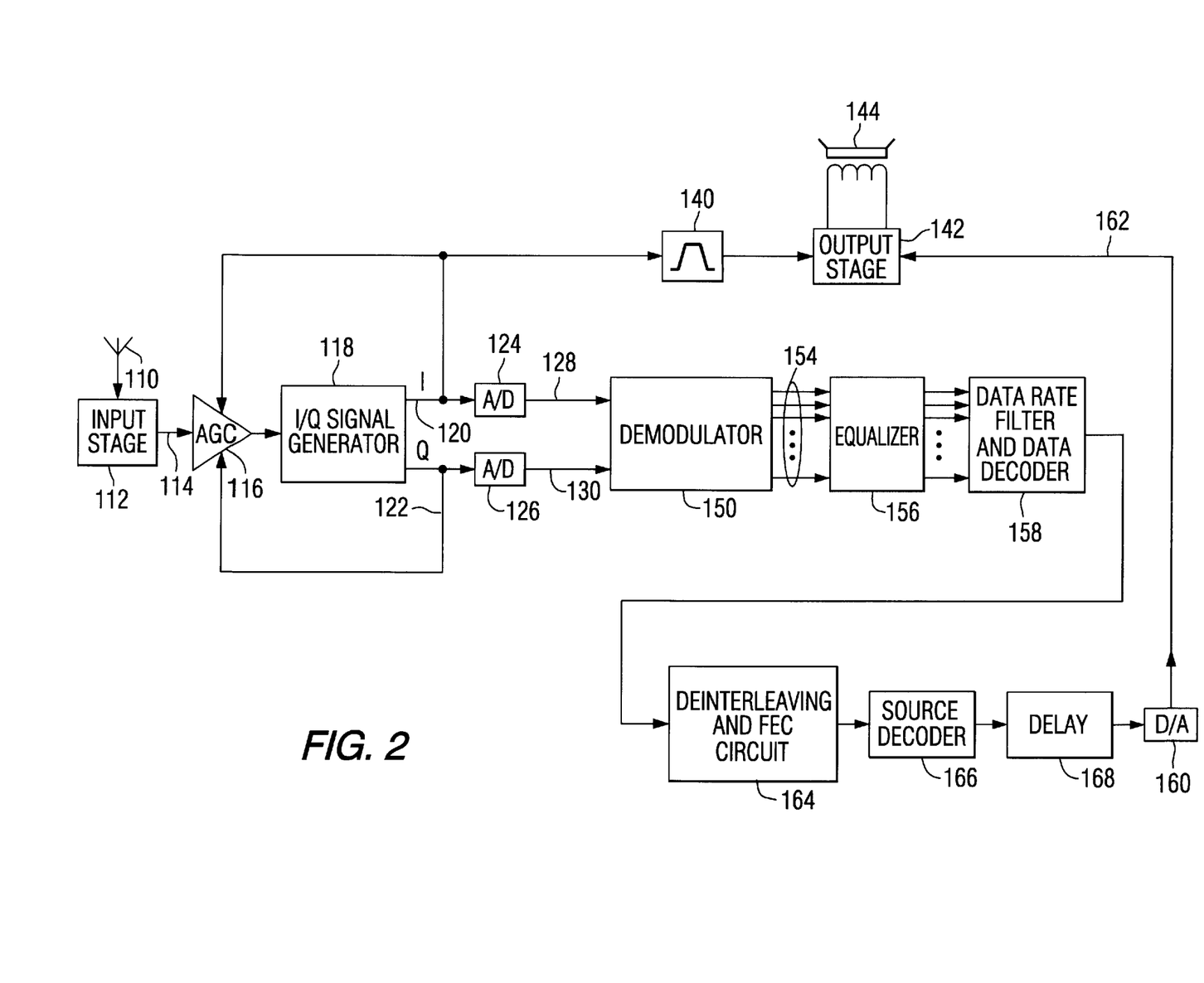
FIG. 2 is a block diagram of a receiver which includes an equalizer that operates in accordance with this invention.

FIG. 2 is a block diagram of a receiver constructed to receive the composite digital and analog signals of FIG. 1. An antenna 110 receives the composite waveform containing the digital and analog signals and passes the signal to conventional input stages 112, which may include a radio frequency preselector, an amplifier, a mixer and a local oscillator. An intermediate frequency signal is produced by the input stages on line 114. This intermediate frequency signal is passed through an automatic gain control circuit 116 to an I/Q signal generator 118. The I/Q signal generator produces an in-phase signal on line 120 and a quadrature signal on line 122. The in-phase channel output on line 120 is input to an analog-to-digital converter 124. Similarly, the quadrature channel output on line 122 is input to another analog-to-digital converter 126. Feedback signals on lines 120 and 122 are used to control the automatic gain control circuit 116. The signal on line 120 includes the analog AM signal which is separated out as illustrated by block 140 and passed to an output stage 142 and subsequently to a speaker 144 or other output device.

A demodulator 150 receives the digital signals on lines 128 and 130, and produces output signals on lines 154. These output signals are passed to an equalizer 156 and to a data rate filter and data decoder 158. The output of the data decoder is sent to a deinterleaving circuit and forward error correction decoder 164 in order to improve data integrity. The output of the deinterleaver/forward error correcting circuit is passed to a source decoder 166. The output of the source decoder is delayed by circuit 168 to compensate for the delay of the analog signal at the transmitter and to time align the analog and digital signals at the receiver. The output of delay circuit 168 is converted to an analog signal by a digital-to-analog converter 160 to produce a signal on 162 which goes to the output stage 142.

U.S. Pat. No. 5,559,830, issued Sep. 24, 1996 describes one mode of operation for an equalizer having an equalizer coefficient update algorithm. The present invention enhances the operation of the equalizer and equalizer coefficient update algorithm by considering the effects that occur when the equalizer coefficients should have non-symmetric magnitude or non- anti-symmetric phase about the center of the FFT.

Figure 3:
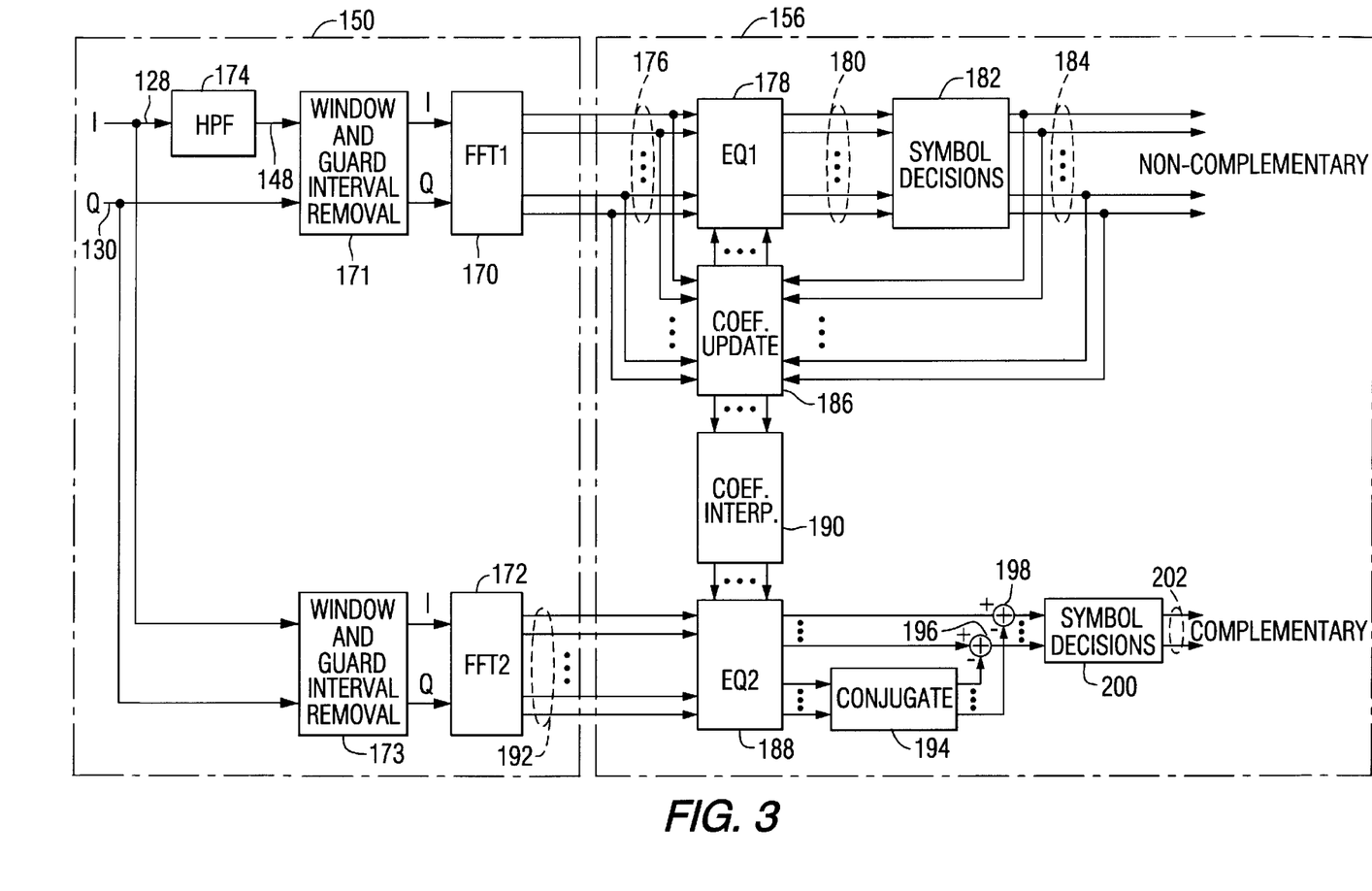
FIG. 3 is a functional block diagram of a demodulator and adaptive equalizer in accordance with this invention.

FIG. 3 is a functional block diagram of a portion of the receiver processing which illustrates the operation of the present invention. Both in-phase (I) and quadrature (Q) signals are provided on lines 128 and 130. These signals may be provided by using down converter elements similar to those shown in FIG. 2. To eliminate the analog signal prior to being input to a first Fast Fourier Transform processor (FFT1) in block 170, a high pass filter 174 has been added to filter the in-phase components of the signal on line 128 thereby producing a filtered signal on line 148. Signals on lines 148 and 130 are processed by windowing and guard band removal circuit 171 prior to being input to FFT1. The window should be applied such that the digital carriers remain orthogonal, or at least the lack of orthogonality among the digital carriers is small enough not to impact system performance. A method of applying a window that preserves orthogonality among the carriers has been developed. In a specific implementation of the method, a root-raised cosine window is applied at the transmitter and receiver. For this window, the tapering occurs on the first and last seven samples of the 135 samples in a baud. After the window has been applied at the receiver, the last seven samples are added to the first seven samples, where the 129th sample is added to the first sample, the 130th sample is added to the second sample, and this pattern continues with the 135th sample being added to the seventh sample. The resulting 128 points are input to an FFT. In some cases it may be advantageous to perform the windowing and guard band removal operations prior to processing by highpass filter 174. In this case, the windowing and guard band removal operations performed by circuits 171 and 173 could be combined to be performed by one circuit.

Elimination of the analog signal may be necessary to prevent spectral spillage from the analog signal onto the in-phase portion of the non-complementary carriers. The disadvantage of this highpass filter is that information needed to properly equalize and demodulate the complementary carriers can be destroyed when the channel has a non-symmetric magnitude or non- anti-symmetric phase about the analog AM carrier frequency. If the in-phase input to FFT1 is high pass filtered to eliminate the analog signal, the output of FFT1, which is input to the equalizer coefficient update algorithm, has certain symmetry properties. Specifically, since the in-phase part of the FFT1 input has nearly zero energy for the complementary carriers, the output of FFT1 will have nearly anti-hermitian symmetry for the complementary carriers. The output of the symbol decision processor for the complementary carriers will have the same property. Since these two anti-hermitian signals serve as the input to the equalizer coefficient update routine, the equalizer coefficients for the complementary carriers will be constrained to have a magnitude response that is symmetric and a phase response that is anti-symmetric about the center frequency of FFT1. Therefore, the equalizer coefficients for the complementary carriers will not converge to the proper values when the equalizer coefficients should have non-symmetric magnitude or non- anti-symmetric phase about the center of FFT1.

The outputs of FFT1 that correspond to the non-complementary carriers are input by way of lines 176 to a first equalizer 178. Equalizer 178 operates on the frequency domain data and adjusts the magnitude and phase of each OFDM carrier to counteract the effects of channel perturbations, transmitter and receiver filters, the transmit and receive antennas, and other factors and processing that affect the magnitude and phase of the signal. The outputs of equalizer 178 on lines 180 are fed to a symbol decision processor 182 which produces signals on lines 184 that are representative of the digital information carried by the non-complementary carriers of the AM compatible broadcast waveform.

Information on lines 176 and 184 is used to update the coefficients of the equalization coefficient vectors in equalizer EQ1, as illustrated by block 186. The coefficients to be applied to the complementary carriers that are processed by equalizer EQ2 in block 188, are determined by interpolation as illustrated in block 190. The input signals 128 and 130 are processed by windowing and guard interval circuit 173 and then input to Fast Fourier Transform processor FFT2, which produces outputs corresponding to the complementary carriers and provides these outputs as inputs to equalizer EQ2 on lines 192. The output of equalizer 156 of FIG. 2 can consist of the combination of the outputs of EQ1 178 and EQ2 188 in FIG. 3, or the combination of signals 184 and 202 in FIG. 3, depending on the type of data required for further processing, which may especially depend on the type of forward error correction (FEC) used in the system. If symbol decision outputs are required, higher signal-to-noise ratios (SNR) for the complementary carriers can be obtained by combining the FFT outputs for pairs of complementary carriers. Specifically, the data from one complementary carrier is added to the negative conjugate of the other complementary carrier and the average is calculated. For each pair of complementary carriers processed by equalizer EQ2, block 194 shows that the negative conjugate of one carrier in the pair is added to the other carrier in the pair as illustrated by adders 196 and 198. Symbol processor 200 then produces outputs that are representative of the digital information carried by the complementary carriers of the AM compatible broadcast signal.

Figure 4A:
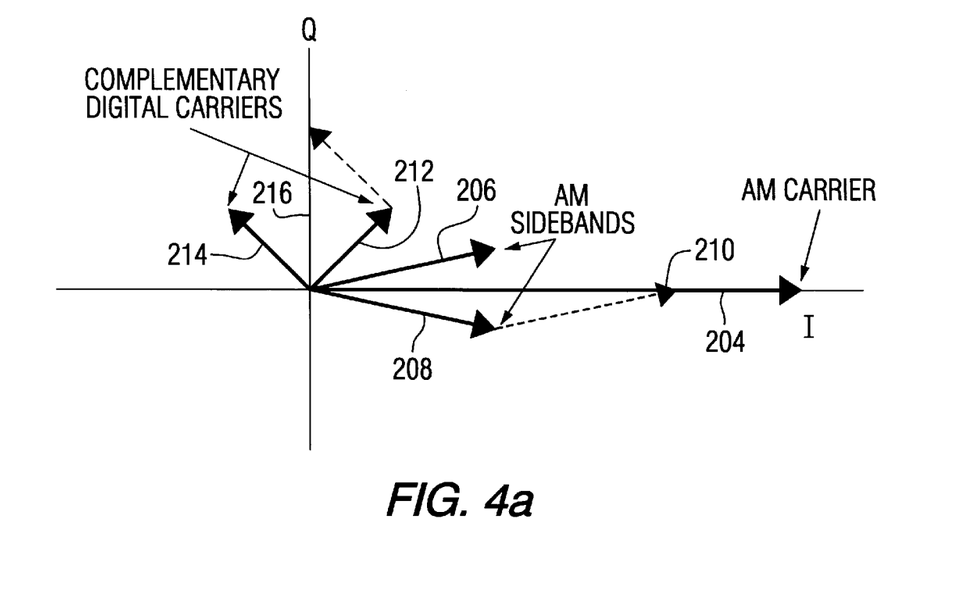
FIGS. 4a and 4b are phasor diagrams which illustrate the operation of the invention.
Figure 4B:
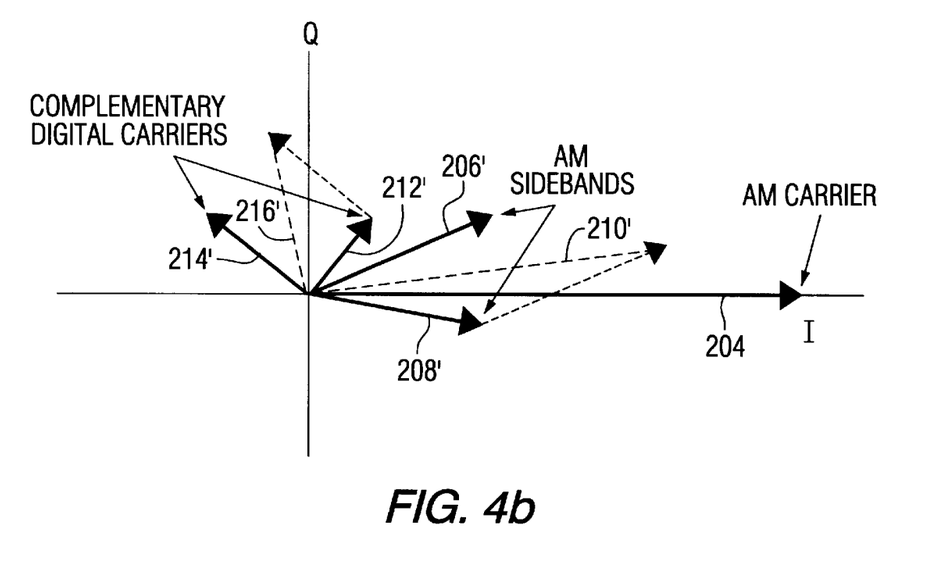

FIGS. 4*a* and 4*b* are vector diagrams which can be used to further illustrate the operation of the invention. FIG. 4*a* shows a phasor diagram of the transmitted signal. The horizontal axis is the n-phase, or I, component and the vertical axis is the quadrature, or I, component. The constant AM carrier level is shown as the phasor 204 along the horizontal axis, and the phasor diagram is fixed with respect to the frequency of the AM carrier. Also shown in FIG. 4*a* are two AM sideband signals 206 and 208. These signals represent an analog tone. Note that FIG. 4*a* shows the resultant 210, or vector addition, of the analog sidebands. The resultant is on the I axis, and will continue to be on the I axis as the analog sidebands rotate. FIG. 4*a* also shows the phasors 212 and 214 for one pair of complementary carriers. The resultant 216 of these carriers is on the Q axis and stays on the Q axis as the complementary carriers rotate.

FIG. 4*b* shows the phasor diagram at the receiver assuming a channel that is non-symmetric in magnitude and non-anti-symmetric in phase. As can be seen, now the resultant 216' of the complementary carrier pair 212' and 214' has energy in both the I and Q signals. If the I signal at the frequency of the complementary carrier pair is eliminated by the highpass filter shown in FIG. 3, the signal cannot be properly equalized and demodulated. Although FIGS. 4*a* and 4*b* show only one complementary carrier pair, the above statements apply to all of the complementary carriers. FIGS. 4*a* and 4*b* show another effect that prevents proper demodulation of the complementary carriers. The resultant 210' of the analog sidebands 206' and 208' also has energy in both the I and Q signals. Therefore, because some of the analog signal energy is now in the Q signal, this also prevents proper demodulation of the complementary carriers. Therefore, the output of FFT1 cannot be used to properly demodulate the complementary carriers when the channel is non-symmetric in magnitude and non- anti-symmetric in phase. However, the output of FFT1 can be used to equalize and demodulate the non-complementary carriers. Because only the non-complementary information is used at the output of FFT1, only the outputs for the non-complementary carriers need to be calculated. As shown in FIG. 3, the output of FFT1 is input to a first equalizer, denoted as EQ1. This equalizer, as well as a second equalizer denoted by EQ2, operate on the frequency domain data and adjust the magnitude and phase of the OFDM carriers to counteract the effects of propagation channel perturbations, transmitter and receiver filters, transmit and receive antennas, and other factors and processing that affect the magnitude and phase of the received signal. The output of EQ1 is input to a symbol decision processor that determines which of the frequency domain constellation points was transmitted for each non-complementary carrier. These decisions, along with the pre-equalized constellation points and the previous values of the equalizer coefficients are used to update the equalizer coefficients. An algorithm such as the least mean squares (LMS) or recursive least squares (RLS) can be used to update the equalizer coefficients.

As shown in FIG. 3, FFT2 is used to obtain the information for the complementary carriers. The I signal that is input to FFT2 is not highpass filtered, and therefore all of the information needed to equalize and demodulate the complementary carriers is available at the output of FFT2. Because only the complementary information is used at the output of FFT2, only the outputs for the complementary carriers need to be calculated. The output of FFT2 is equalized by EQ2. As shown in FIG. 3, for each complementary carrier pair, the negative conjugate of one carrier in the pair is added to the other carrier in the pair. The sum is then used to make a symbol decision for the complementary pair. The coefficients for EQ2 could be updated in the same manner as the coefficients for EQ1, but the presence of the analog signal would make the coefficient estimates noisy. To overcome this, the equalizer coefficients for EQ2 can be obtained via interpolation using the coefficients for EQ1. If the control loops of the receiver such as the automatic gain control (AGC), carrier tracking, and symbol tracking are at the proper values, the center frequency of the FFT will be at a known, constant magnitude and phase.

Figure 5:
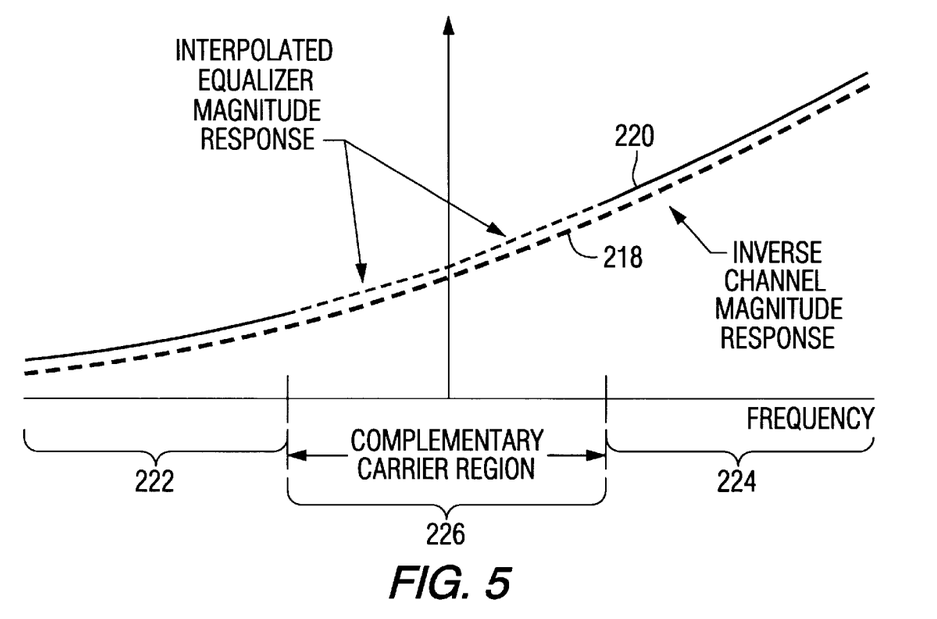
FIG. 5 is a diagram showing the magnitude of the response of the equalizer.

FIG. 5 illustrates an example where linear interpolation is used to determine the equalizer coefficients across the complementary carriers. FIG. 5 actually shows the inverse of the channel response 218 because this is the desired response for the equalizer. The response 220 that would be obtained from the equalizer magnitude is also shown in FIG. 5. For clarity, the illustrated equalizer response is displaced upward slightly so it can be distinguished from the inverse channel response. Note that the response follows the inverse channel response in the regions 222 and 224 of the non-complementary carriers. As can be seen, if the channel response 218 is relatively smooth, the interpolated equalizer coefficients are near to the ideal values, and the equalizer magnitude response 220 closely follows the inverse channel magnitude in the region 226 of the complementary carriers.

Several variations of interpolation are possible. For example, the values of the equalizer coefficients for the first OFDM carriers outside of the complementary region could be used to linearly interpolate from their values to the value at the center of the channel. Linear interpolation has been found to be satisfactory in the large majority of cases where the signal is in the commercial AM broadcast band (530 kHz to 1710 kHz) and the width of the complementary region is less than 10 kHz. As an alternative, it may be desirable to use non-complementary carriers that are further away from the center of the channel if the non-complementary carrier or carriers that are located closest to the complementary carrier region are affected by filters such as the highpass filter that can be used to eliminate the analog signal from the in-phase portion of the received signal. Also, information from many of the non-complementary carriers could be used in the interpolation process. Interpolation algorithms other than linear could be used. Some of the well known interpolation algorithms include cubic spline, polynomial interpolation, FFT based interpolation, and exponential or logarithmic curve fitting. The non-complementary equalizer coefficients used for the interpolation and the complementary equalizer coefficients obtained from the interpolation can be averaged over time to reduce the effects of noise. Smoothing across frequency can also be used to reduce the effects of noise. Instead of interpolating the linear magnitude of the coefficients, interpolation on a log magnitude scale may be advantageous. Alternatively, instead of interpolating the magnitude and phase of the equalizer coefficients, it may be desirable to interpolate the corresponding real and imaginary coordinates that can be used to represent the equalizer coefficients.

This invention provides a system for demodulating and adaptively equalizing an amplitude modulated compatible digital audio broadcast signal. In the foregoing specification certain preferred practices and embodiments of this invention have been set out, however, it will be understood that the invention may be otherwise embodied within the scope of the following claims.

What is claimed is:

1. A method of demodulating and equalizing an amplitude modulated compatible digital broadcasting signal including an amplitude modulated radio frequency signal having a first carrier modulated by an analog program signal in a first frequency spectrum, a plurality of digitally modulated carrier signals positioned within a bandwidth which encompasses the first frequency spectrum, a first group of the digitally modulated carrier signals including complementary carrier signals and lying within the first frequency spectrum, and second and third groups of the digitally modulated carrier signals including non-complementary carrier signals and lying outside of the first frequency spectrum, said method comprising the steps of:

taking the Fast Fourier Transform of the amplitude modulated compatible digital broadcasting signal to produce a first transformed signal representative of the non-complementary carriers;

processing said first transformed signal to produce a first equalized signal by multiplying said first transformed signal by a first equalization vector, said first equalization vector comprising a first plurality of equalizer coefficients;

updating said first plurality of equalizer coefficients used for the non-complementary signals;

taking the Fast Fourier Transform of the amplitude modulated compatible digital broadcasting signal to produce a second transformed signal representative of the complementary carriers;

determining a second equalization vector comprising a second plurality of equalizer coefficients, said second plurality of equalizer coefficients being determined by interpolation using coefficients of said first plurality of equalizer coefficients; and processing said second transformed signal to produce a second equalized signal by multiplying said second transformed signal by said second equalization vector.

2. The method of claim 1, further comprising the steps of:

separating the amplitude modulated compatible digital broadcasting signal into in-phase and quadrature components; and filtering the amplitude modulated compatible digital broadcasting signal in-phase component prior to the step of taking the Fast Fourier Transform of the amplitude modulated compatible digital broadcasting signal to produce said first transformed signal.

3. The method of claim 2, wherein the step of filtering the in-phase component comprises:

passing the in-phase component through a highpass filter.

4. The method of claim 1, further comprising the step of:

windowing the amplitude modulated compatible digital broadcast signal and removing a guard interval from the amplitude modulated compatible digital broadcast signal prior to each of the steps of taking the Fast Fourier Transform of the amplitude modulated compatible digital broadcast signal.

5. The method of claim 1, wherein said second plurality of equalizer coefficients are calculated using said first set of equalizer coefficients and a known value at the center of the first frequency spectrum, such calculation being performed by interpolation using one of linear interpolation, cubic spline interpolation, polynomial interpolation, Fast Fourier Transform based interpolation, or logarithmic curve fitting.

6. The method of claim 1, wherein said interpolation is averaged over time.

7. The method of claim 1, wherein said interpolation is performed on real and imaginary components used to represent said first and second plurality of equalizer coefficients.

8. A method of operating a radio frequency receiver for receiving an amplitude modulated compatible digital broadcasting signal including an amplitude modulated radio frequency signal having a first carrier modulated by an analog program signal in a first frequency spectrum, a plurality of digitally modulated carrier signals positioned within a bandwidth which encompasses the first frequency spectrum, a first group of the digitally modulated carrier signals including complementary carrier signals and lying within the first frequency spectrum, and second and third groups of the digitally modulated carrier signals including non-complementary carrier signals and lying outside of the first frequency spectrum, said method comprising the steps of:

receiving said amplitude modulated compatible digital broadcasting signal;

taking the Fast Fourier Transform of said amplitude modulated compatible digital broadcasting signal to produce a first transformed signal representative of the non-complementary carriers;

processing said first transformed signal to produce a first equalized signal by multiplying said first transformed signal by a first equalization vector, said first equalization vector comprising a first plurality of equalizer coefficients;

updating said first plurality of equalizer coefficients used for the non-complementary signals;

taking the Fast Fourier Transform of said amplitude modulated compatible digital broadcasting signal to produce a second transformed signal representative of the complementary carriers;

determining a second equalization vector comprising a second plurality of equalizer coefficients, said second plurality of equalizer coefficients being determined by interpolation using coefficients of said first plurality of equalizer coefficients;

processing said second transformed signal to produce a second equalized signal by multiplying said second transformed signal by said second equalization vector; and producing an output signal in response to said first and second equalized signals.

9. The method of claim 8, further comprising the steps of:

separating said amplitude modulated compatible digital broadcasting signal into in-phase and quadrature components; and filtering the amplitude modulated compatible digital broadcasting signal in-phase component prior to the step of taking the Fast Fourier Transform of the amplitude modulated compatible digital broadcasting signal to produce said first transformed signal.

10. The method of claim 9, wherein the step of filtering the in-phase component comprises:

passing the in-phase component through a highpass filter.

11. The method of claim 8, further comprising the step of:

windowing the amplitude modulated compatible digital broadcast signal and removing a guard interval from the amplitude modulated compatible digital broadcast signal prior to each of the steps of taking the Fast Fourier Transform of the amplitude modulated compatible digital broadcast signal.

12. The method of claim 8, wherein said second plurality of equalizer coefficients are calculated using said first set of equalizer coefficients and a known value at the center of the first frequency spectrum, such calculation being performed by interpolation using one of linear interpolation, cubic spline interpolation, polynomial interpolation, Fast Fourier Transform based interpolation, or logarithmic curve fitting.

13. The method of claim 8, wherein said interpolation is averaged over time.

14. The method of claim 8, wherein said interpolation is performed on real and imaginary components used to represent said first and second plurality of equalizer coefficients.

15. An apparatus for demodulating and equalizing an amplitude modulated compatible digital broadcasting signal including an amplitude modulated radio frequency signal having a first carrier modulated by an analog program signal in a first frequency spectrum, a plurality of digitally modulated carrier signals positioned within a bandwidth which encompasses the first frequency spectrum, a first group of the digitally modulated carrier signals including complementary carrier signals and lying within the first frequency spectrum, and second and third groups of the digitally modulated carrier signals including non-complementary carrier signals and lying outside of the first frequency spectrum, said method comprising the steps of:

means for taking the Fast Fourier Transform of the amplitude modulated compatible digital broadcasting signal to produce a first transformed signal representative of the non-complementary carriers;

means for processing said first transformed signal to produce a first equalized signal by multiplying said first transformed signal by a first equalization vector, said first equalization vector comprising a first plurality of equalizer coefficients;

means for updating said first plurality of equalizer coefficients used for the non-complementary signals;

means for taking the Fast Fourier Transform of the amplitude modulated compatible digital broadcasting signal to produce a second transformed signal representative of the complementary carriers;

means for determining a second equalization vector comprising a second plurality of equalizer coefficients, said second plurality of equalizer coefficients being determined by interpolating coefficients of said first plurality of equalizer coefficients; and means for processing said second transformed signal to produce a second equalized signal by multiplying said second transformed signal by said second equalization vector.

16. The apparatus of claim 15, further comprising:

means for separating said amplitude modulated compatible digital broadcasting signal into in-phase and quadrature components; and means for filtering the non-complementary carrier signal in-phase component.

17. The apparatus of claim 16, wherein the means for filtering comprises:

a highpass filter.

18. The apparatus of claim 15, further comprising:

means for windowing the amplitude modulated compatible digital broadcast signal and removing a guard interval from the amplitude modulated compatible digital broadcast signal.

19. The apparatus of claim 15, wherein said second plurality of equalizer coefficients are calculated using said first set of equalizer coefficients and a known value at the center of the first frequency spectrum, such calculation being performed by interpolation using one of linear interpolation, cubic spline interpolation, polynomial interpolation, Fast Fourier Transform based interpolation, or logarithmic curve fitting.

20. The apparatus of claim 15, wherein said interpolation is averaged over time.

21. The apparatus of claim 15, wherein said interpolation is performed on real and imaginary components used to represent said first and second plurality of equalizer coefficients.

22. A radio frequency receiver for receiving an amplitude modulated compatible digital broadcasting signal including an amplitude modulated radio frequency signal having a first carrier modulated by an analog program signal in a first frequency spectrum, a plurality of digitally modulated carrier signals positioned within a bandwidth which encompasses the first frequency spectrum, a first group of the digitally modulated carrier signals including complementary carrier signals and lying within the first frequency spectrum, and second and third groups of the digitally modulated carrier signals including non-complementary carrier signals and lying outside of the first frequency spectrum, said receiver comprising:

means for receiving said amplitude modulated compatible digital broadcasting signal;

means for taking the Fast Fourier Transform of the amplitude modulated compatible digital broadcasting signal to produce a first transformed signal representative of the non-complementary carriers;

means for processing said first transformed signal to produce a first equalized signal by multiplying said first transformed signal by a first equalization vector, said first equalization vector comprising a first plurality of equalizer coefficients;

means for updating said first plurality of equalizer coefficients used for the non-complementary signals;

means for taking the Fast Fourier Transform of the amplitude modulated compatible digital broadcasting signal to produce a second transformed signal representative of the complementary carriers;

means for determining a second equalization vector comprising a second plurality of equalizer coefficients, said second plurality of equalizer coefficients being determined by interpolating coefficients of said first plurality of equalizer coefficients;

means for processing said second transformed signal to produce a second equalized signal by multiplying said second transformed signal by said second equalization vector; and means for producing an output signal in response to said first and second equalized signals.

23. The receiver of claim 22, further comprising:

means for separating said amplitude modulated compatible digital broadcasting signal into in-phase and quadrature components; and means for filtering the non-complementary carrier signal in-phase components.

24. The receiver of claim 23, wherein means for filtering comprises:

a highpass filter.

25. The receiver of claim 23, further comprising:

means for windowing the amplitude modulated compatible digital broadcast signal and removing a guard interval from the amplitude modulated compatible digital broadcast signal.

26. The receiver of claim 23, wherein said second plurality of equalizer coefficients are calculated using said first set of equalizer coefficients and a known value at the center of the first frequency spectrum, such calculation being performed by interpolation using one of linear interpolation, cubic spline interpolation, polynomial interpolation, Fast Fourier Transform based interpolation, or logarithmic curve fitting.

27. The receiver of claim 23, wherein said interpolation is averaged over time.

28. The receiver of claim 23, wherein said interpolation is performed on real and imaginary components used to represent said first and second plurality of equalizer coefficients.

* * * * *